(12) United States Patent
Karlsson et al.

(10) Patent No.: US 9,964,150 B2
(45) Date of Patent: May 8, 2018

(54) METHOD FOR LUBRICATING A ROLLING ELEMENT BEARING

(71) Applicant: AKTIEBOLAG SKF, Göteburg (SE)

(72) Inventors: Mikael R Karlsson, Norrköping (SE); Håkan Lindgren, Jingan (CN)

(73) Assignee: AKTIEBOLAGET SKF, Gothenburg (SE)

( * ) Notice: Subject to any disclaimer, the term of this patent is extended or adjusted under 35 U.S.C. 154(b) by 213 days.

(21) Appl. No.: 14/433,075

(22) PCT Filed: Sep. 20, 2013

(86) PCT No.: PCT/SE2013/000145
§ 371 (c)(1),
(2) Date: Apr. 2, 2015

(87) PCT Pub. No.: WO2014/054995
PCT Pub. Date: Apr. 10, 2014

(65) Prior Publication Data
US 2015/0204384 A1 Jul. 23, 2015

(30) Foreign Application Priority Data

Oct. 4, 2012 (SE) ...................................... 1200596

(51) Int. Cl.
*F16C 33/54* (2006.01)
*F16C 33/46* (2006.01)
(Continued)

(52) U.S. Cl.
CPC .......... *F16C 33/467* (2013.01); *F16C 23/086* (2013.01); *F16C 33/48* (2013.01); *F16C 33/541* (2013.01); *F16C 33/543* (2013.01); *F16C 33/547* (2013.01); *F16C 33/6629* (2013.01); *F16C 33/6637* (2013.01);
(Continued)

(58) Field of Classification Search
CPC .... F16C 19/38; F16C 23/086; F16C 33/4676; F16C 33/4694; F16C 33/541; F16C 33/547; F16C 33/6614; F16C 33/66; F16C 33/6651; F16C 33/6681
See application file for complete search history.

(56) References Cited

U.S. PATENT DOCUMENTS

| 6,461,048 | B1 | 10/2002 | Ioannides |
| 2007/0248297 | A1 | 10/2007 | Shorr et al. |
| 2012/0163745 | A1* | 6/2012 | Maeda ................... F16C 19/52 384/477 |

FOREIGN PATENT DOCUMENTS

| BE | 491913 A | 11/1949 |
| DE | 102009056354 A1 | 6/2011 |

(Continued)

*Primary Examiner* — Christopher Besler
(74) *Attorney, Agent, or Firm* — Bryan Peckjian; SKF USA Inc. Patent Dept.

(57) ABSTRACT

A method for lubricating a rolling element bearing, the method comprising a step of providing a bearing cage for retaining rolling elements when the bearing cage is in use, the bearing cage having at least one first ring structure to which at least one first cage bar is connected. The at least one first cage bar is constructed so that a diameter of the bearing cage is largest at one of a point or a region along the length of the at least one first cage bar so as to improve lubricant flow towards the rotational center of rolling elements when the bearing cage is in use.

13 Claims, 4 Drawing Sheets

(51) Int. Cl.
    *F16C 23/08*     (2006.01)
    *F16C 33/48*     (2006.01)
    *F16C 33/66*     (2006.01)
    *F16C 19/38*     (2006.01)

(52) U.S. Cl.
    CPC .......... *F16C 19/38* (2013.01); *F16C 33/4676* (2013.01); *F16C 33/6614* (2013.01); *F16C 33/6651* (2013.01); *F16C 33/6681* (2013.01)

(56) References Cited

FOREIGN PATENT DOCUMENTS

| | | | | |
|---|---|---|---|---|
| EP | 2476926 A1 | 7/2012 | | |
| GB | 961203 A | 6/1964 | | |
| GB | 2489441 A1 * | 10/2012 | .............. | F16C 33/51 |
| JP | 2008249105 A | 10/2008 | | |

* cited by examiner

METHOD FOR LUBRICATING A ROLLING ELEMENT BEARING

CROSS REFERENCE TO RELATED APPLICATIONS

This is a National Stage Application claiming the benefit of International Application Number PCT/SE2013/000145 filed on 20 Sep. 2013, which claims the benefit of Sweden (SE) Patent Application Serial Number 1200596-3, filed on 4 Oct. 2012, both of which are incorporated herein by reference in their entireties.

TECHNICAL FIELD

Method for lubricating a rolling element bearing.

BACKGROUND OF THE INVENTION

A bearing cage is a separator structure that keeps the individual rolling elements of a rolling element bearing evenly spaced around a race.

Usually, rolling element bearings are supplied with an amount of lubricant grease for lubricating purposes. Ideally, the grease gradually releases its oil content, thus ensuring an extended lubrication of the bearing. It is desirable to apply the grease as close as possible to the parts to be lubricated, e.g. the surface of the rolling elements. In particular, the amounts of grease which are collected on the cage bars are beneficial. These amounts are close to the rolling elements, thus enabling a direct supply of oil thereto.

However, centrifugal forces, which occur when a rolling element bearing is in use and limited adhesion have a negative influence on the grease retention capacity of the bearing cage. As a result, the grease on the cage bars may disappear, and collect in other areas where no supply of lubricant towards the center of the rolling elements or the raceways of the rings is possible.

U.S. Pat. No. 6,461,048 concerns a cage for a rolling element bearing with improved grease retention. The cage comprises at least one ring shaped body carrying regularly spaced cage bars, each pair of adjacent cage bars defining a cage pocket for accommodating a rolling element. At least one of the cage bars comprises elements situated radially outside and/or inside, the element(s) defining at least one space for accommodation of grease.

SUMMARY OF THE INVENTION

An object of the present invention is to provide an improved method for lubricating a rolling element bearing. This aim is achieved by a method that comprises the step of providing a bearing cage for retaining rolling elements when the bearing cage is in use, whereby the bearing cage has at least one first ring structure to which at least one first cage bar is connected. The at least one first cage bar is constructed so that the diameter of the bearing cage is largest at a point/region along the length of the at least one first cage bar so as to improve lubricant flow towards rotational center of the rolling elements when the bearing cage is in use. The expression "rotational center" is intended to mean the center of the rolling surface of a rolling element, which is located halfway between the ends of the rolling element.

Such a bearing cage allows more grease to attach itself to the cage bars when the bearing cage is in use and a prolonged residence time of grease in a rolling bearing is thereby obtained, as well as more reliable lubrication of the rolling element bearing. The at least one cage bar may be provided with a raised point/region anywhere along the length thereof which will increase the surface area of the at least one cage bar and consequently the amount of lubricant that can be accommodated thereon, and which will improve lubricant flow towards the rotational center of the rolling elements. More lubricant will thereby collect on the at least one raised point/region and then fall onto the rolling surface of the rolling element in the vicinity of the at least one raised point/region. It should be noted that at least one first cage bar may be provided with a plurality of raised points/areas along its length so as to increase its surface area and improve lubricant flow towards the rotational center of rolling elements when the bearing cage is in use. According to an embodiment of the invention the method comprises the step of providing the point/region at a position above the center of the rolling surface of each rolling element, whereby lubricant falling from the point/region will be supplied to the center of the rolling surfaces of the rolling elements, i.e. at a position halfway between the ends of each rolling element.

According to another embodiment of the invention the method comprises the step of providing the bearing cage with two axially opposed ring structures whereby the at least one cage bar extends between the axially opposed ring structures. The at least one first cage bar may comprise the point/region halfway between the two axially opposed ring structures. According to a further embodiment of the invention the at least one first cage bar of the at least one first ring structure comprises end portions that follow the rolling element diameter profile. The end portions may extend over 5%-30%, preferably 10-20% of the length of the at least one cage bar. The point/region may be arranged in the central portion of the at least one first cage bar, which central portion extends between these end portions.

According to an embodiment of the invention the at least one first cage bar comprises a side surface that is arranged to extend along an outer surface of a rolling element when the bearing cage is in use, whereby the side surface comprises a radially outer edge and a radially inner edge. The distance between the radially outer edges of two adjacent cage bars between which a rolling element is accommodated when the bearing cage is in use is greater than the distance between two adjacent radially inner edges of the two adjacent cage bars. The side surface of the at least one cage bar may be provided with at least one chamfered edge. For example, the chamfered edge may be provided at the radially inner edge of the first cage bar.

According to an embodiment of the invention the method comprises the step of provided the bearing cage with at least one second ring structure to which at least one second cage bar is connected, whereby the at least one second ring structure is arranged to be located radially inwards of the at least one first ring structure. Lubricant may thereby be accommodated on the second ring structure when the bearing cage is in use. The at least one second cage bar may be constructed so that the diameter of the bearing cage is largest at a point/region along the length of the at least one second cage bar so as to improve lubricant flow towards rotational center of the rolling elements when the bearing cage is in use.

According to another embodiment of the invention the at least one second ring structure is provided with at least one reservoir for the accommodation of lubricant when the bearing cage is in use.

The at least one first ring structure may be integrally formed with the at least one second ring structure or it may be arranged to be connected to the at least one second ring structure, by means of a snap fit connection or welding for example. The first ring structure and/or the second ring structure may comprise metal, such as steel, or any other suitable material. A first ring structure and/or second ring structure may for example comprise sheet metal. The bearing cage may be used in a rolling element bearing, such as a ball bearing or roller bearing, a cylindrical roller bearing, a toroidal roller bearing, a taper roller bearing, a conical roller bearing or a needle roller bearing.

BRIEF DESCRIPTION OF THE DRAWINGS

The present invention will hereinafter be further explained by means of non-limiting examples with reference to the appended figures where.

It should be noted that the drawings have not been drawn to scale and that the dimensions of certain features have been exaggerated for the sake of clarity.

DETAILED DESCRIPTION OF EMBODIMENTS

Figures 1A, 1B, 1C:
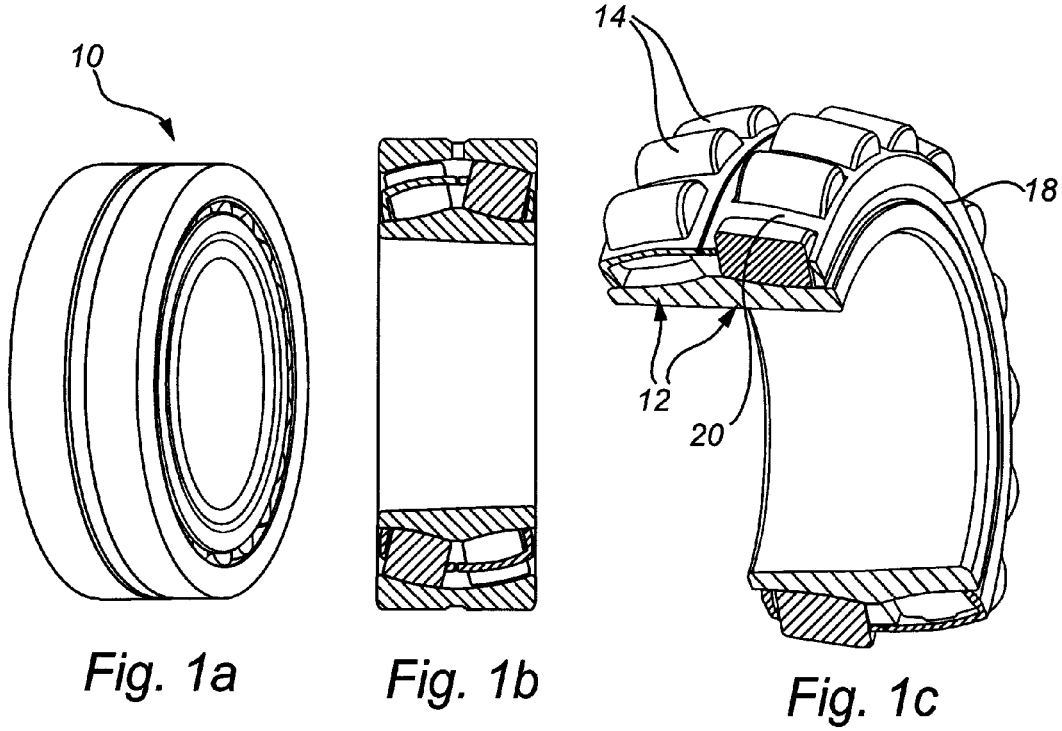
FIGS. 1a, 1b, and 1c show a bearing cage according to the prior art.

FIG. 1a-c show a rolling bearing 10 according to the prior art. The rolling bearing comprises two bearing cages 12 for retaining rolling elements 14. Each bearing cage 12 comprises a ring structure 18 to which a plurality of cage bars 20 are connected. The cage bars 20 have a substantially flat outer surface that follows the diameter profile of the rolling elements 14. The diameter of each bearing cage 12 is largest at the rings of the ring structures 18 which are located in between the two rows of rolling elements 14.

Figures 2A, 2B:
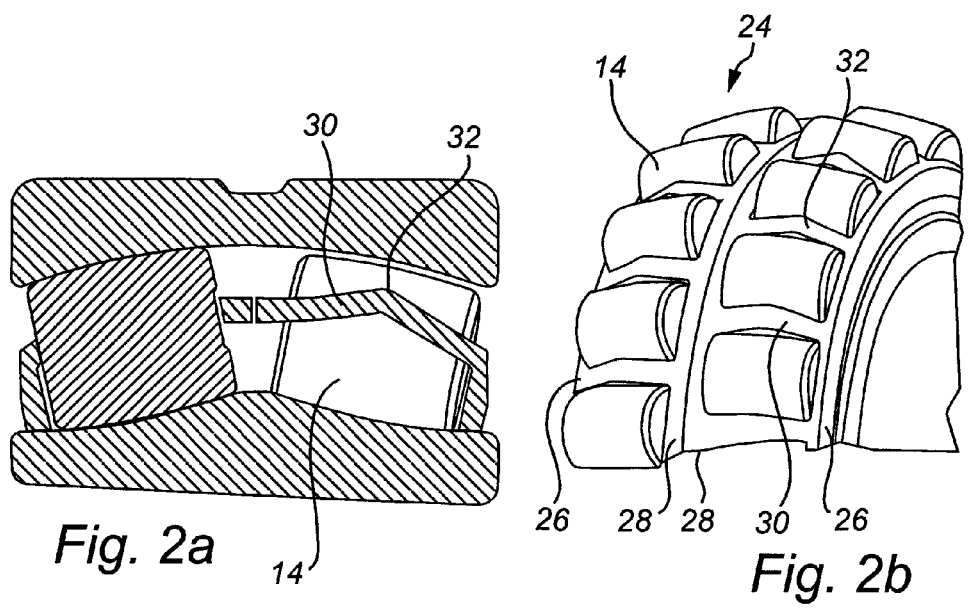
FIGS. 2a, 2b, 3a, 3b, 4a, and 4b show a rolling element bearing lubricated using a method according to an embodiment of the invention.

FIGS. 2a-b show two bearing cages 24 for retaining two rows of rolling elements 14, which bearing cages 24 may be used in a method according to an embodiment of the present invention. Each bearing cage 24 comprises a pair of axially opposed rings 26, 28 whereby a plurality of first cage bars 30 extends between the two axially opposed rings 26, 28. All of the first cage bars 30 are constructed so that the diameter of each bearing cage 24 is largest at a point 32 halfway along the length of the first cage bars 30, whereby the point 32 will be located at a position above the center of the rolling surface of each rolling element 14, so as to improve lubricant flow towards the rotational center of rolling elements 14 when the bearing cages 24 are in use. Lubricant collecting on the point 32 will namely fall onto the center of the rolling surface of each rolling element 14. Lubricant storage is increased as compared to cage bars 20 of a bearing cage 12 according to the prior art, due to the increased surface area of the first cage bars 30 of a bearing cage 24 used in a method according to an embodiment of the present invention.

The first cage bars 30 may comprise end portions that follow the rolling element diameter profile. Such end portions may extend over 5%-30%, preferably 10-20% of the length of a first cage bar 30, whereby at least part of the central portion between the end portions is constructed so that the diameter of each bearing cage 24 is largest at a point/region therebetween so as to improve lubricant flow towards the rotational center of rolling elements 14 when the bearing cages 24 are in use. For example, at least part of the central portion between the end portions may be raised with respect to the end portions to form such a point/region of largest diameter.

Figure 3A:
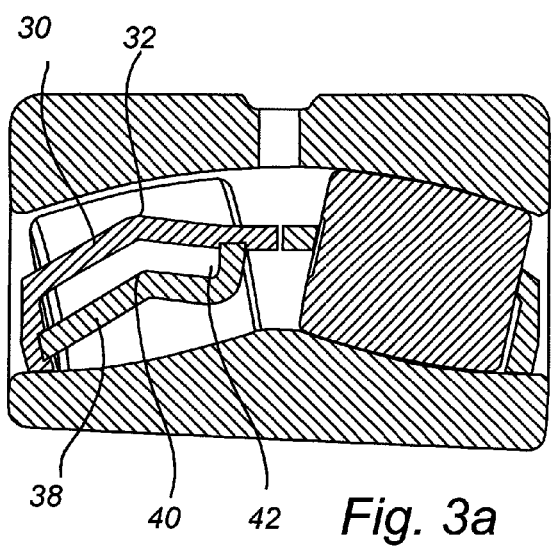
Figure 3B:

FIGS. 3a-b show a bearing cage comprising a first ring structure 34 comprising a pair of axially opposed rings 26, 28 whereby a plurality of first cage bars 30 extends between the two axially opposed rings 26, 28. The bearing cage 24 also comprises a second ring structure 36 to which a plurality of second cage bars 38 is connected, whereby the second ring structure 38 is arranged to be located radially inwards of the at least one first ring structure 34 when the bearing cage 24 is in use. The second cage bars 38 are constructed so that the diameter of the second ring structure 36 is largest at a point 40 along the length of the second cage bars 38 so as to improve lubricant flow towards the rotational center of rolling elements 14 when the bearing cage 24 is in use. The "length" of a first or second cage bar 30, 38 is intended to mean the distance from a first ring 26 of a ring structure to the end of the first or second cage bar 30, 38 or to a second ring 28 of a ring structure, which distance is measured along the outer surface of the first or second cage bar 30, 38.

At least one first cage bar 30 and/or at least one second cage bar 38 may be provided with at least one channel so as to improve lubricant flow towards the rotational center of rolling elements 14 when the bearing cage 24 is in use.

The second ring structure 38 may be provided with at least one reservoir 42 for the accommodation of lubricant when the bearing cage 24 is in use.

Figure 4A:
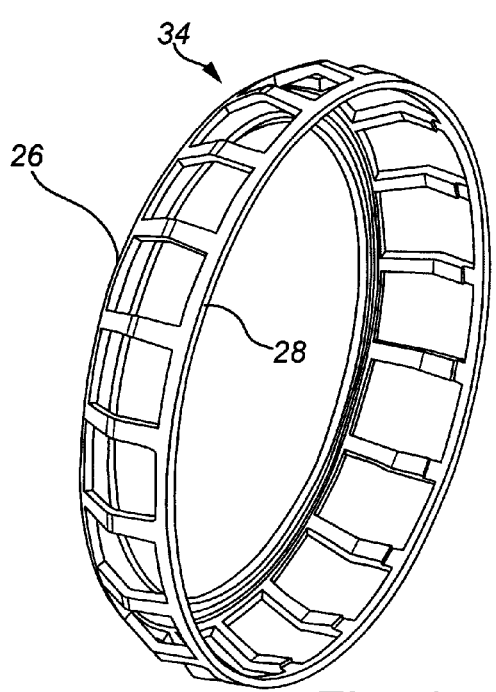
Figure 4B:
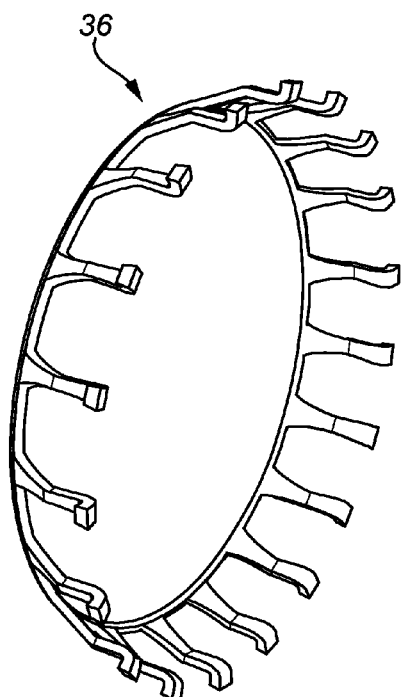

FIGS. 4a-b show a first ring structure 34 that is arranged to be connected to a second ring structure 36, for example by means of a snap fit connection or welding. Alternatively, the first ring structure 34 may be integrally formed with the second ring structure 36.

Figure 5A:
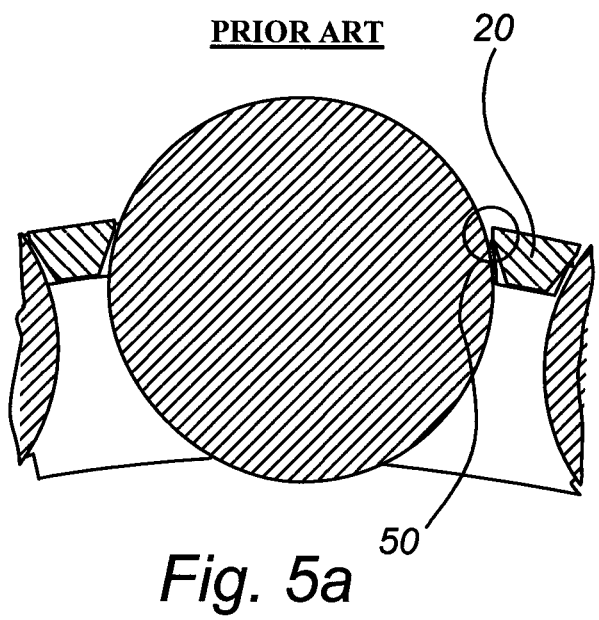
FIG. 5a shows cage bars according to the prior art.
Figure 5B:
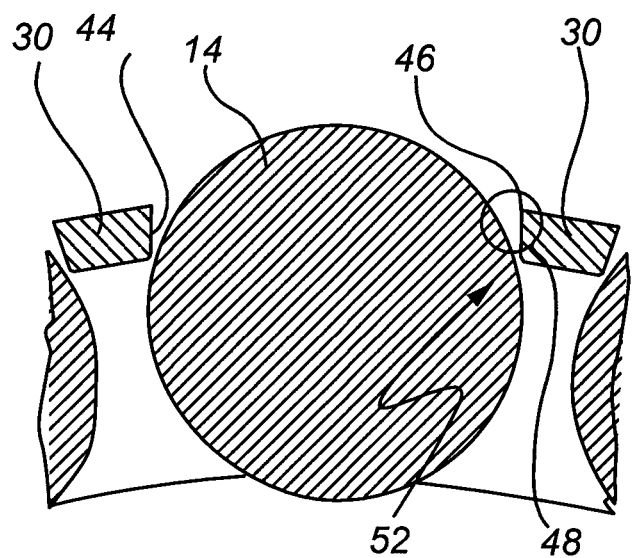
FIG. 5b shows cage bars that can be used in a method according to an embodiment of the invention.

FIG. 5a shows two adjacent cage bars 20 of a bearing cage according to the prior art. FIG. 5b shows two adjacent first cage bars 30 that can used in a method according to an embodiment of the present invention. The first cage bars 30 comprise a side surface 44 that is arranged to extend along an outer surface of a rolling element 14 when a bearing cage is in use. The side surface 44 comprises a radially outer edge 46 and a radially inner edge 48 and the distance between the radially outer edges 46 of two adjacent cage bars 30 that accommodate a rolling element 14 therebetween when the bearing cage is in use, is larger than the distance between the radially inner edges 48 of the two adjacent cage bars 30. In this way lubricant can be accommodated in the space between the outer surface of a rolling element 14 and the side edge 44 of a cage bar 30.

The side surface 44 of the at least one first cage bar 30 is provided with at least one chamfered edge 52. The at least one chamfered edge 52 may be provided at the radially inner edge 52 of the first cage bar 30 as shown in the illustrated embodiment.

In the cage bar according to the prior art shown in FIG. 5a each cage bar 20 comprises a lug 50 which limits the amount of lubricant that can be accommodated in the space between the surface of a rolling element 14 and the side edge of a cage bar 20. A cage bar 30 used in a method according to an embodiment of the present invention does not comprise such a lug 50.

Figure 6:
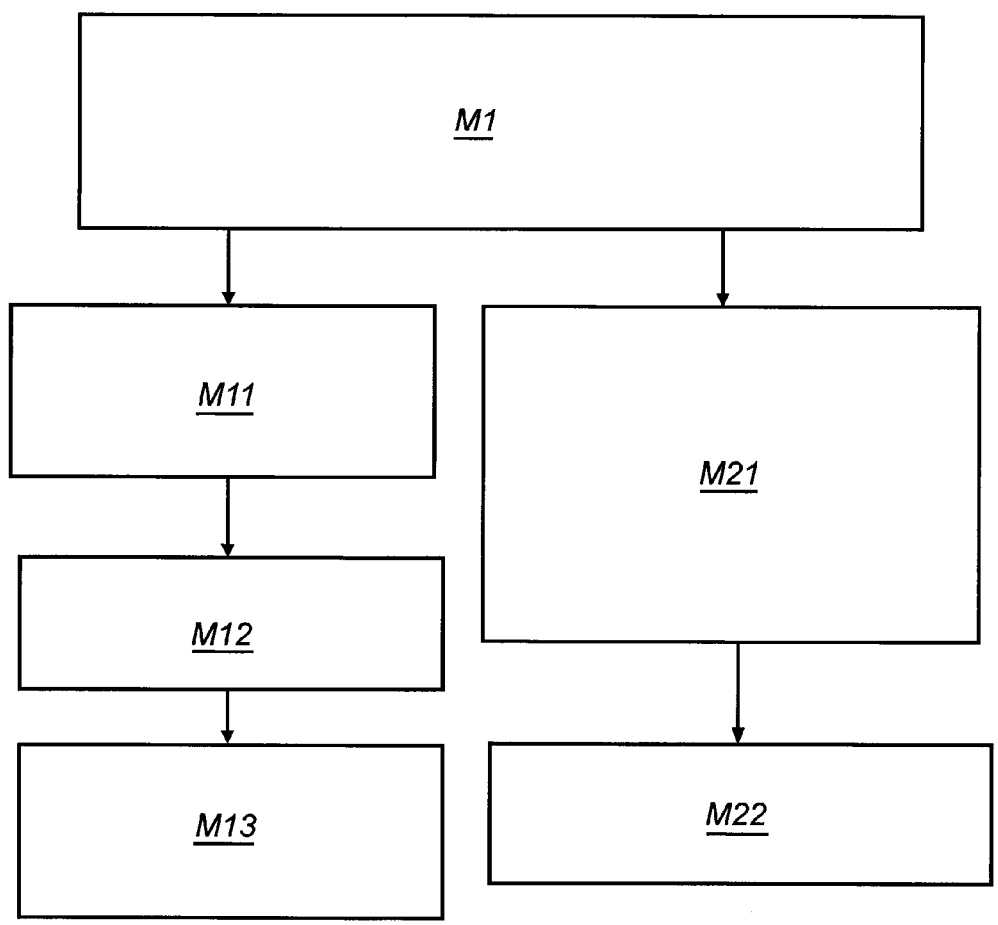
FIG. 6 is a flow diagram showing the steps of a method according to an embodiment of the invention.

FIG. 6 is a flow diagram showing the steps of a method according to an embodiment of the invention. The method comprises the steps of providing a bearing cage with at least one first ring structure to which at least one first cage bar is connected, whereby the at least one first cage bar comprises a raised point/region along its length, see step M1. Optionally the lug is removed from the at least one first cage bar 30, whereby the distance between the radially outer edges 46 of two adjacent cage bars 30 that accommodate a rolling element 14 therebetween when the bearing cage is in use, is arranged to be larger than the distance between the radially inner edges 48 of the two adjacent cage bars 30, see step M11 to M12. Additionally, the at least one first cage bar 30 may be provided with a side surface 44 with at least one chamfered edge 52, see step M13. Furthermore, the bearing cage may be provided with at least one integrally formed or attachable second ring structure to which at least one second cage bar is connected, whereby the at least one second cage bar may comprise a raised point/region along its length and/or a reservoir for the accommodation of lubricant, see step M21-M22. In FIG. 6, each step may be defined as:

M1: Provide a bearing cage with at least one first ring structure to which at least one first cage bar is connected, whereby the at least one first cage bar comprises a raised point/region along its length, M11: Provide the at least one first cage bar with a radially outwards converging side surface, M12: Remove the lug from a side surface of the at least one first cage bar, M13: Provide a side surface of the at least one first cage bar with at least one chamfered edge, M21: Provide the bearing cage with at least one integral or attachable second ring structure to which at least one second cage bar is connected, whereby the at least one second cage bar comprises a raised point/region along its length, and M22: Provide the at least one second cage bar with a reservoir for the accommodation of lubricant. Further modifications of the invention within the scope of the claims would be apparent to a skilled person. For example, a bearing cage may be constituted by a plurality of separate parts, such as by a pair of bearing cage halves.

The invention claimed is:

1. A method for providing a bearing cage that improves lubricant flow of a rolling element bearing, the method comprising steps of:
   providing a bearing cage for retaining rolling elements when the bearing cage is in use, the bearing cage having at least one first ring structure, the at least one first ring structure comprising first and second axially opposed rings and a first cage bar, the first cage bar being connected to each of the first and second axially opposed rings and extending therebetween, whereby the first cage bar is constructed so that a diameter of the bearing cage is largest at one of a point and a region along a length of the first cage bar which is spaced from the first and second axially opposed rings so as to improve lubricant flow towards the rotational center of the rolling elements when the bearing cage is in use,
   providing the bearing cage with at least one second ring structure, the at least one second ring structure comprising a third ring and a second cage bar, the second cage bar connecting to and extending from the third ring, whereby the at least one second ring structure is arranged to be located radially inwards of the at least one first ring structure such that a gap exists between the first cage bar and the second cage bar, the first cage bar radially overlapping the second cage bar, the third ring being engaged with the first axially opposed ring and the second cage bar being connected to the first cage bar such that the first cage bar, the second cage bar, the first ring and the third ring define an enclosed area when viewed in cross-section.

2. The method according to claim 1, further comprising a step of:
   providing the one of the point and the region at a position above a center of a rolling surface of each of the rolling elements.

3. The method according to claim 1, wherein the one of the point and the region is provided halfway between the first and second axially opposed rings.

4. The method according to claim 1, wherein the first cage bar of the at least one first ring structure comprises end portions that follow a rolling element diameter profile.

5. The method according to claim 4, wherein the end portions extend over 5%-30% of a length of the first cage bar.

6. The method according to claim 1, the first cage bar further comprising a side surface that is arranged to extend along an outer surface of one of the rolling elements when the bearing cage is in use,
   the side surface further comprising a radially outer edge and a radially inner edge and whereby a distance between the radially outer edges of two adjacent cage bars between which one of the rolling elements is located when the bearing cage is in use is greater than a distance between two adjacent radially inner edges of the first cage bar and a second one of the first cage bar which is adjacent to the first cage bar.

7. The method according to claim 6, the side surface of the first cage bar further comprising at least one chamfered edge.

8. The method according to claim 7, the first cage bar further comprising the at least one chamfered edge provided at the radially inner edge thereof.

9. The method according to claim 1, wherein the second cage bar is constructed so that a diameter of the second ring structure is largest at one of a second point and a second region along a length of the second cage bar so as to improve lubricant flow towards the rotational center of rolling elements when the bearing cage is in use, wherein the second cage bar circumferentially overlaps the first cage bar and the at least one of the second point.

10. The method according to claim 1, the at least one second ring structure further comprising at least one reservoir for the accommodation of lubricant when the bearing cage is in use.

11. The method according to claim 1, wherein the at least one first ring structure is integrally formed with the at least one second ring structure.

12. The method according to claim 9, wherein the at least one first ring structure is arranged to be connected to the at least one second ring structure.

13. The method according to claim 4, wherein the end portions extend over 10-20% of a length of the first cage bar.

* * * * *